United States Patent [19]

Kirkpatrick et al.

[11] 4,101,610

[45] Jul. 18, 1978

[54] LIQUID-GAS CONTACTING TRAY

[75] Inventors: Robert Duncan Kirkpatrick, Tonawanda; David William Weiler, Burt, both of N.Y.

[73] Assignee: Union Carbide Corporation, New York, N.Y.

[21] Appl. No.: 772,941

[22] Filed: Feb. 28, 1977

[51] Int. Cl.$^2$ .............................................. B01F 3/04
[52] U.S. Cl. ..................................... 261/110; 202/158; 261/114 JP
[58] Field of Search ............ 261/97, 110, 113, 114 R, 261/114 A, 114 JP, 114 VT

[56] References Cited

U.S. PATENT DOCUMENTS

| | | | |
|---|---|---|---|
| 2,568,749 | 9/1951 | Kittel | 261/113 |
| 2,787,453 | 4/1957 | Hibshman et al. | 261/114 JP |
| 3,062,517 | 11/1962 | Voetter et al. | 261/114 JP |
| 3,156,746 | 11/1964 | Kittel | 261/114 JP |
| 3,282,576 | 11/1966 | Bruckert et al. | 261/114 JP |
| 3,338,566 | 8/1967 | Kittel | 202/158 X |
| 3,417,975 | 12/1968 | Williams et al. | 261/114 JP |
| 3,550,916 | 12/1970 | Hoppe et al. | 261/114 JP |
| 3,729,179 | 4/1973 | Keller | 261/114 R |
| 3,759,498 | 9/1973 | Matsch | 261/114 JP |

*Primary Examiner*—Richard L. Chiesa
*Attorney, Agent, or Firm*—Steven J. Hultquist

[57] ABSTRACT

A slotted sieve-tray providing a liquid flow path including a divergent flow section adjacent the liquid inlet, with slots which are oriented away from the tray diametral streamline at high angles in the liquid inlet region, so as to overcome fluid maldistribution problems associated with divergent liquid flow on the tray.

22 Claims, 14 Drawing Figures

LIQUID-GAS CONTACTING TRAY

BACKGROUND OF THE INVENTION

1. Field of the Invention

This invention relates to an improved gas-liquid contacting tray of the type used in the distillation and and absorption systems for mass transfer between two fluids.

2. Description of the Prior Art

In the art of mass transfer for selectively separating at least one component from a mixture of at least two constituents as for example in distillation and absorption applications, an upwardly flowing vapor or gas stream is typically contacted on a substantially horizontally aligned contacting surface with a generally downwardly flowing liquid stream. In a conventional distillation process, such contacting permits the upwardly flowing vapor or gas stream to become selectively enriched with the lighter components of the mixture, i.e., those components with relatively high volatilities, while the generally downwardly flowing liquid stream becomes selectively enriched with the heavier components of relatively low volatilities.

Two general types of liquid-gas contacting trays are widely used in distillation and absorption applications, bubble cap trays and perforated trays. Due to the broad utility of perforated trays in low pressure separations as for example for the separation of thermally sensitive compounds, as a consequence of the low tray pressure drop characteristic of perforated trays relative to bubble cap trays, and because of their simple and relatively inexpensive design, perforated trays are widely employed and are displacing the use of bubble cap trays in many applications in which the latter were formerly employed.

Although numerous types of gas-liquid contacting trays can be groups under the general classification of perforated trays, including many proprietary valve type trays, the most common type in conventional use is the so-called sieve tray. This tray is typically constructed with a flat tray member perforated with a multiplicity of round holes. Such perforations provide passageways for the upflowing contacting vapor, which then intimately comingles with liquid flowing across the tray member. Successive trays within a liquid-gas contacting column are interconnected by means of downcomer liquid discharge devices in a manner well known to those skilled in the art.

A widely employed sieve tray is the so-called single-pass cross-flow tray. In this tray design liquid discharges from an imperforate receiving area near the tray's outer edge, flows across an inlet weir which forms a chord of the circle defined by the column diameter, and then flows across the entire active surface of the tray member in first a diverging and then a converging flow pattern. The liquid after flowing across the tray member, discharges at a similar outer edge region diametrically opposed to the liquid inlet area, and then is transferred by downcomer to the next lower tray where it is introduced immediately below the liquid discharge of the preceding overlying tray. the liquid then flows across the active surface of the underlying tray member in the opposite direction with respect to that of the preceding tray, and so on down the column.

The single-pass cross-flow tray has achieved widespread usage because of its simple and relatively inexpensive construction while simultaneously allowing high utilization of the available column area for gas-liquid contact along with high overall contacting efficiency levels. With respect to the latter characteristic, two types of contacting efficiencies concern the designer of gas-liquid contacting trays, point efficiencies and tray or plate efficiencies. Point efficiencies on the tray member contacting surface are principally determined by the physical and thermodynamic properties of the fluid system involved in the contacting operation, as well as by the degree of localized intimacy of contact between the gas and liquid phases involved. Since the designer has relatively little independent control over these factors, the point efficiencies of a given system under normal operating conditions are more or less invariant. Tray or plate efficiencies, on the other hand, are related to the aforementioned point efficiencies by a phenomenon termed "flow path enhancement" and, theoretically, can be higher than the point efficiencies measured at various points on the tray member contacting surface. The factors which limit the actual plate efficiency of a contacting tray surface include diffusive backmixing and departures from bulk plug flow across the tray surface. Although backmixing is a function of fluid properties and, therefore, is not under the designer's control, it is possible to control the flow distribution of the fluid on the tray member contacting surface. In fact, by providing an ideal plug flow of liquid across large diameter sieve trays, plate efficiencies higher than 100% are theoretically possible.

In spite of the foregoing considerations, it is well established in the separation art that large diameter sieve trays do not operate in an ideal fashion. In the first place, such trays typically require a large hydraulic gradient to promote liquid flow from the inlet to the outlet of the tray member. The requisite tray inlet liquid head results in considerable weeping in the inlet region of the tray. Such weeping is highly detrimental to overall contacting system efficiency because the liquid being processed effectively bypasses gas-liquid contact on two successive trays in the contacting column, bypassing from the inlet region of a first tray to the outlet region of a second tray and thence to the inlet area of a third tray.

U.S. Pat. No. 3,417,975 to B. Williams and E.F. Yendall describes a gas-liquid contact tray employing a uniform pattern of fixed size openings with walls normal to the tray surface and a uniform pattern of obliquely inclined openings, the latter being oriented in the downstream direction of liquid flow. Trays designed in accordance with William et al patent, hereafter referred to as slotted sieve trays, performed with improved efficiency owing to the elimination of longitudinal hydraulic gradient in the liquid on the tray. The additional degree of design freedom afforded by the two sets of fixed apertures results in utilization of only a predetermined, appropriate fraction of the total available vapor thrust to accomplish liquid transport across the tray. Other factors being equal, the neutralization of the hydraulic gradient now produces uniform resistance to vapor penetration through the liquid depth on the tray, and both the vapor and liquid flows are uniformly distributed over the active area of the tray. The propulsive effect of the vapor on the Williams et al tray balances the liquid hydraulic gradient thereon and accordingly eliminates the aforementioned weeping problem to a large extent.

In addition, conventional sieve trays are beset with a problem of inactivity which is manifested by the tendency of the unaerated liquid flowing on the tray from the liquid inlet to remain in an unaerated state on the tray member surface. Thus the liquid entering the tray often remains inactive for a substantial distance across the tray unless means is provided in its path to positively initiate bubbling activity. U.S. Pat. No. 3,282,576 to W. Bruckert describes a bubbling promotor, which when disposed at the tray inlet, increases momentarily the kinetic energy of the liquid — hence, reducing its hydrostatic head. Bubbling is initiated immediately at the tray threshhold and once initiated, continues across the tray, thereby allowing full use of the contacting surface for gas-liquid mass transfer contacting.

The combination of these two technical innovations enables high localized point efficiencies to be achieved on the gas-liquid contacting surfaces of the sieve tray type. However, as is taught in U.S. Pat. No. 3,759,498 to L.C. Matsch, one additional tray feature is needed on large diameter trays with diverging-converging flow paths. To permit high overall trays efficiencies to be achieved on such trays, liquid flow must approximate the ideal plug flow profile as closely as possible. The Matsch patent teaches that the performance of single-pass cross-flow sieve trays can be significantly improved by utilizing a specific pattern of the vapor slot openings of the type as taught by the Williams et al patent. According to the Matsch teachings, the identification of certain key zones and the implementation of a certain slotting density and slotting orientation in each zone is necessary to eliminate problems resulting from unequal gas-liquid froth height and improper liquid distribution on the tray surface. More specifically, by progressively increasing the slot density in tray member regions downstream of the tray transverse center line and by progressively increasing the slotting angle relative to the tray's diametral streamline in regions located downstream of the transverse center line and transverse to the diametral stream line, the operation of a cross flow tray is considerably improved. As is implicit from the previous discussion, such improvement of tray performance arises from the flow path enhancement phenomenon since the liquid flow now approximates the ideal plug flow profile as it traverses the gas-liquid contacting surface of the tray.

For a given tray diameter, single-pass cross-flow trays have a limited liquid capacity, since the single liquid downcomer means tends to becomes overloaded at high liquid flow rates. At increasing liquid flow levels, the single downcomer of single-pass cross-flow trays will become increasingly filled with liquid, and as the liquid loading is further increased the liquid will eventually back-up onto the overlying tray surface. Such increased liquid level on the tray eventually chokes the tray resulting in massive entrainment. This condition, commonly referred to as "flooding", is accompanied by a sharp decline in tray efficiency and an increase in pressure drop across the tray. As a result, in those instances where high liquid loadings are necessary or desirable, more complex tray configurations employing different liquid flow patterns, such as two-pass cross-flow trays, may become more desirable. Such two-pass trays provide correspondingly more downcomer area and lower liquid loading per unit width of the active tray surface than an equivalent diameter single-pass cross-flow tray.

Under the foregoing considerations, any increase in the liquid handling capacity of liquid contacting trays which is derived from an increase in the number of downcomers or liquid inlet means is obtained at the expense of an increase in cost of the tray and a decrease in overall tray efficiency, for comparable localized point efficiencies on the tray, as a result of a decrease in the flow path enhancement phenomenon. In addition, in many instances an increase in the number of downcomers for the tray also results in a decrease in the total attainable active area of the tray. Accordingly, it becomes essential to maintain the flow profile as close as possible to ideal plug flow behavior on trays with differing flow patterns, so that overall tray efficiencies commensurate with single-path cross-flow trays can be maintained. Unfortunately, this has been difficult to achieve in practice, particularly with two-pass, side-to-center flow trays.

In the two-pass, side-to-center flow sieve tray, the liquid is introduced to the tray member contacting surface by a liquid inlet adjacent the outer periphery of the tray and flows in a diverging flow pattern to a liquid discharge outlet directly across the tray surface from the inlet, with the outlet extending transversely along a diameter of the tray. The problem of poor flow hydraulics on such two-pass, side-to-center flow trays is well known and documented in the art. Unfortunately, the prior art has not overcome the problem of correcting such hydraulic performance deficiency, which is the result of severe maldistribution of liquid on the tray member contacting surface. In the design of two-pass, side-to-center flow trays, the design approach for single-pass cross-flow trays has typically been applied, but such approach has proved unavailing in overcoming the liquid maldistribution problem on the tray. Nonetheless, relative to a single-pass tray for the same liquid flow, the liquid loading on a two-pass tray per unit tray width is only half as great. As a result of such difference, two-pass trays provide considerably higher liquid capacity and substantially lower liquid gradient than single-pass cross-flow trays. Accordingly, two-pass trays are particularly advantageous for contacting applications characterized by high liquid-gas ratios or large tray diameters.

Although the slotting arrangement taught by the aforementioned Matsch patent is capable of providing relatively efficient hydrualic behavior in application to single-pass cross-flow trays of moderate active area, coresponding advantage is not attained on the two-pass, side-to-center flow tray. The reason for this difference can be attributed to the structural configurational differences between the single-pass cross-flow tray and the two-pass, side-to-center flow design. In contrast to single-pass cross-flow trays, the divergent liquid inlet region of a side-to-center, two-pass tray is not contiguous with a converging outlet zone. It has been hypothesized that in a single-pass cross-flow tray provided with the Matsch improvement, the variable-directional slotting provided in the outlet zone provides a corrective influence over the inlet zone. Such corrective action and smoothing out of liquid gradient on the tray member contacting surface is not possible in the two-pass, side-to-center flow design, for the reason that there is no converging outlet section associated therewith.

Accordingly, it is an object of the present invention to provide an improved liquid-gas contact tray of the two-pass, side-to-center flow slotted sieve type, characterized by improved distribtuion of liquid across the entire active tray surface.

Another object of the invention is to provide improvement of the hydraulic behavior of large diameter cross-flow trays designed in accordance with the teachings of the Matsch patent.

Other objects and adavantages of this invention will be apparent from the ensuing disclosure and appended claims.

SUMMARY OF THE INVENTION

This invention relates to an improved gas-liquid contacting tray of the type used in distillation and absorption systems for mass transfer between the two fluids. This invention relates in particular to a circular-edged liquid-gas contacting tray of the slotted sieve-type for effecting intimate contact between rising vapor and liquid flowing across a member of the tray having main flat top and bottom surfaces from a liquid inlet at one edge of the tray member along a liquid flow path on the main top surface including a diverging flow section adjacent the inlet to a liquid discharge at an opposite edge of the tray member. A plurality of fixed size openings are distributed across the tray member and extend therethrough with walls normal to the main flat top and bottom surfaces for gas flow. A plurality of elevated portions are formed from the tray members across the surfaces thereof with an upper surface raised from the main flat top surface having a front leading edge separated from the main flat top surface to form an elongated slot opening therewith of greater width than height. The raised upper surface is inclined to the main flat top surface and has a back edge integral with such surface and each elevated portion is spaced from adjacent elevated portions by the main top flat surface entirely surrounding the elevated portion.

The specific improvement of the present invention comprises a first band portion of the tray member adjacent to the liquid inlet and extending therefrom downstream for distance at least 20 percent of the length of the tray diametrical streamline from the liquid inlet to the tray transverse center line and extending transversely outwardly from vicinity of the tray diametrical streamline for a distance at least 25 percent of the transverse length of the liquid inlet. Slot openings in the tray member first band portion have angular orientation with respect to and away from the tray diametrical streamline such that slot angle of individual slots is greater than the angle formed by the diametrical streamline and a tangent line at the tray member outer edge ar the point of intersection with liquid inlet. The density of slotting in the first band portion is such that the ratio of the total area of the slot openings therein to the total active area of the first band portion is between 0.0001 and 0.30.

In one preferred embodiment of the invention, the tray member first band portion is bounded at its transverse outer extremity by an adjacent second band portion of the tray member extending transversely to the tray member outer edge and downstream at least coextensively with the first band portion. The second band portion has angular orientation of slot openings therein with respect to and away from the tray diametrical stream line such that the slot angle of individual slots is between 15° and 45°. The density of slotting in the second band portion is such that the ratio of the total area of the slot openings therein to the total active area of the second band portion is between 0.00001 and 0.30.

In another preferred embodiment of the invention, the tray member first band portion extends distance only part of the length of the tray diametrical streamline from the liquid inlet to the tray transverse center line and is bounded at its downstream extremity by an adjacent transversely extending third band portion of the tray member extending downstream to the tray transverse center line and having lower slot density than the first and second band portions. The present invention is advantageously employed in a double-pass, side-to-center flow type of tray with a liquid discharge extending from edge to edge of the tray substantially adjacent to the transverse centerline thereof so as to divide the tray into two equal parts, each part having the liquid inlet thereof extending transversely and parallelly oriented with respect to the liquid discharge at the opposite edge of the tray member of the tray part.

The invention may also be advantageously employed with the simple single-pass type of tray wherein the liquid enters adjacent an outer edge and flows across the entire active surface of the tray in first a diverging pattern and then a converging pattern for discharge at the liquid outlet adjacent an outer edge opposite to the mentioned outer edge. The liquid is then transferred by downcomer means to the next lower tray where it enters immediately below the outlet of the next above tray and flows across the active surface in the opposite direction to that on the latter.

The invention may further be advantageously employed with a tray of the parallel-flow type. In the parallel flow tray, a center baffle extends across the tray along the diameter thereof so as to divide the tray into two equal parts. Liquid inlet means are provided at the end of one tray part immediately adjacent a first end of the center baffle for flow thereacross, with liquid outlet means immediately adjacent a second end of the center baffle at the opposite edge of the one tray part. Liquid inlet means are provided at the edge of the other tray parts immediately adjacent to the second end of the center baffle for flow thereacross in the opposite direction to the liquid flow path across the one tray part, with liquid outlet means immediately adjacent the first end of the center baffle at the opposite edge of the other tray part.

The invention may suitably be employed in connection with the tray utilizing the teaching of the aforementioned Matsch patent, U.S. Pat. No. 3,759,498, incorporated herein to the extent pertinent. In such trays, at least some of the slot openings in the tray part downstream the tray transverse center line are angularly oriented with respect to the tray diametrical streamline such that: (a) the slot angle of individual slots increases in the transverse direction to the liquid flow path from the diametrical streamline to the tray outer edge, (b) the slot angle of individual slots also increases in the longitudinal direction of the liquid flow path to the liquid outlet, and (c) the slot angle of individual slots immediately adjacent to the liquid outlet and tray active surface outer edge at the point of intersection with the liquid outlet is within 20° of the angle formed by a tangent line at the point of intersection and the diametrical streamline.

As used herein, the term "tray diametrical streamline" means the straight line flow path of liquid from the tray inlet to tray liquid discharge, parallel to and approximately adjacent to the column diameter. Flow along the diametrical streamline of the tray is remote from the cylindrical wall enclosing the installed tray in service, and is not appreciably deflected as a result of the diverging or converging character of the liquid flow on the tray member top surface. The term "tray transverse centerline" means a line on the tray member main top surface which is perpendicular to the tray diametrical streamline at the maximum transverse extent of the tray member. The expression "slot angle" refers to the included angle between the slot vector for a given slot and the tray diametrical streamline. The vector of the slot, is defined as a horizontal line normal to the width of the slot opening.

The present invention is based on the discovery that maldistribution of liquid on a slotted sieve tray including a divergent flow section adjacent the liquid inlet can be corrected by providing a modified pattern of slots at the liquid inlet region of the tray member, wherein slots are oriented away from the tray diametrical streamline at radically high angles with respect to the desired liquid streamline. Although the present invention has been found to be particularly valuable in application to two pass cross flow trays of the side-to-center flow type, the invention is not limited to such tray configuration. Testing has demonstrated that the broad concept of high angle inlet slotting contemplated under the present invention has utility on all types of cross flow gas liquid contacting trays.

DESCRITPION OF THE PREFERRED EMBODIMENTS

Figures 1, 2, 3:
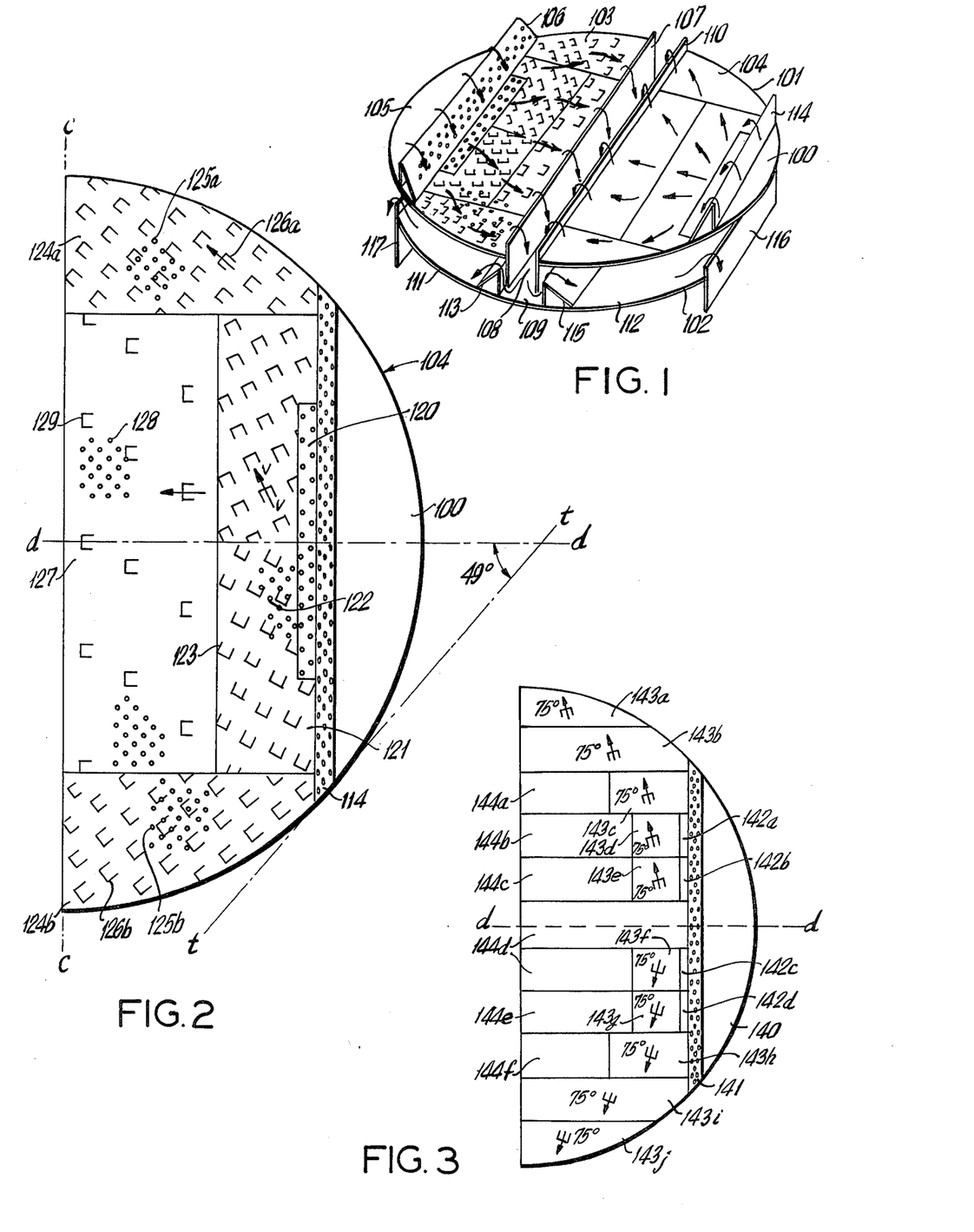
FIG. 1 is an isometric view looking downwardly on an assembly of slotted sieve trays, including an upper tray constructed according to the invention of the double-pass, side-to-center flow type.
FIG. 2 is a plan view of one-half of the FIG. 1 upper tray in greater detail, showing the band portions of different slot angular orientations.
FIG. 3 is a plan view of one-half of another double-pass, side-to-center flow slotted sieve tray according to the invention.

Referring now to the drawings, FIG. 1 is an isometric view looking downwardly on an assembly of two slotted sieve trays including an upper tray constructed according to the invention of the double pass, side-to-center flow type. The column walls have been omitted from the figure, but it is to be understood that the circular edges of the trays are sealed substantially tightly against the vertical wall of the cylindrical column enclosing the trays. The trays are each of the two-pass type wherein the liquid flowing downwardly through the column flows across the tray member main flat top surfaces in two discrete liquid streams. The liquid flows across the tray member from a liquid inlet at one edge of the tray member along a liquid flow path on the main surface including a diverging flow section adjacent to the inlet to a liquid discharge at an opposite edge of the tray member extending transversely from edge to edge of the tray along the tray transverse center line. From the liquid discharge at the tray transverse center line of the upper tray in the assembly illustrated, the discharged liquid is passed by downcomer means to the underlying tray, which is of the center-to-side flow variety. In the latter tray, the liquid inlet is disposed adjacent the tray transverse center line so that liquid introduced to the tray member main flat top surface flows thereacross from the liquid inlet to a liquid discharge at the periphery of the tray adjacent the column wall as shown. In this manner, on alternate trays, the liquid streams flow either toward each other or away from each other.

More specifically, contacting tray 101 is divided into half tray 103 on which liquid flows forward and to the right in the figure as drawn, and half tray 104 on which liquid flows from right to left as drawn. One half of the liquid stream flowing down the column enters half tray 103 from a downcomer at liquid inlet 105 and thereafter flows across and downwardly over the sloped surface bubbling promotor 106. Bubbling promotor 106 is constructed as a sloped ramp with perforations only on the sloped surface thereof. Its structure and function are in accordance with the aforementioned Bruckert U.S. Pat. No. 3,282,576. Other bubble promoting means may be used at liquid inlet, as for example, a lip-type restricted opening, inasmuch as such means form no part of the present invention. The foam or froth created at promotor 106 flows across the main flat top surface of the slotted and perforated tray member and is discharged from the tray by discharge means comprising outlet weir 107 and downcomer 108. Upon entry into the downcomer 108, entrapped vapor in the discharged liquid disengages from the liquid and combines with the major gas stream, continuing upward to the next tray above. The vapor-disengaged substantially clear liquid flows through the downcomer 108 to the downcomer receiving pan 109. The liquid flows under the outlet wall 107 of half-tray 103 onto the underlying half-tray 111. The outlet wall 107 of half-tray 103 descends into the downcomer 108 to a sufficient depth such that vapor bypass up through the downcomer is prevented. The liquid flowing onto half-tray 111 flows successively over the buble promotor 113 and across the main flat top surface of the associated tray member.

While one half of the column liquid is flowing over half-tray 103, the other half of the column liquid is flowing over half-tray 104. The latter liquid flows successively over bubble promotor 114, and the main flat top surface of tray member of half-tray 104, After traversing the main flat top surface contacting zone, the liquid overflows weir 110, passes into downcomer 108 and drops to the level of tray 102 onto receiving pan 109. It then flows successively over bubble promotor 115, main flat surface of the associated tray member of half-tray 112 and finally over the outlet weir 116 of that half-tray. As against this cross-wise generally horizontal flow of liquid on the main tray surfaces, the column vapor flows substantially upwardly from tray to tray through the contacting column. This vapor is prevented from bypassing through the respective downcomer of the column by the outlet walls 107, 110, 116 and 117.

As indicated, the present invention is based on the discovery that deviations from plug flow on gas liquid contacting trays of the slotted sieve type can be corrected by providing a modified pattern of slots at the inlet section of the tray member. In the tray embodiment shown in FIG. 1, the tray member of the upper tray 101 is divided into three band portions having different slotting configurations, which can be quantatively differentiated by the slotting angle provided in each band portion. Although the variation in slotting angle from one portion to another on the tray member may be gradual, in actual practice it is generally more desirable to provide band portions as discrete sections of the tray member, thereby greatly facilitating fabrication of the trays.

FIG. 2 is a plan view of one half of the FIG. 1 upper tray in greater detail, showing the band portion of different slot angular orientation. The liquid inlet 100 for this half tray may suitably comprise an unperforated portion of the tray member main flat top surface underlying the associated downcomer means. A transversely extending bubble promotor means 114, which may suitably be the type taught by the aforementioned Bruckert patent, is disposed on the tray member main flat top surface between liquid inlet 100 and the tray member first band portion 121. The bubble promotor serves the function of initiating bubbling in the introduced liquid and assures continuity of bubbling action across the main flat top surface of the tray member. A transversely extending unslotted band portion 120 is as shown disposed between the bubble promotor means 114 and the aforementioned tray member first band portion 121. The unslotted band portion 120 serves to limit excessive inlet spraying, but may suitably be dispensed with in the event inlet spraying and liquid entrainment in the gas flow are nonexistent or occur to only a very low extent. The various band portions 121, 124a, 124b and 127, comprise the major fraction of the active area of the tray member. As used herein the term "tray active area" refers to the portion of the main flat top surface area of the tray member on which intimate contact between rising vapor and liquid flowing across the tray member is effected. Thus the active area for the half tray shown in FIG. 2 excludes only the main flat top surface area associated with liquid inlet 100. On the tray member active area a plurality of fixed size openings are distributed across the member and extend therethrough with walls normal to the main top and bottom surfaces for gas flow therethrough, and a plurality of elevated portions are formed from the tray member across the surfaces each with an upper surface raised from the main flat top surface, having a front leading edge separated from the main flat top surface to form an elongated slot opening therewith of greater width than height. The raised upper surface is inclined to the main flat top surface and has a back edge integral with such surface and each elevated portion is spaced from adjacent elevated portions by the main flat top surface entirely surrounding such elevated portions. The flow path includes the diverging flow section adjacent the liquid inlet to the liquid discharged at the opposite end of the tray member.

As shown, the first band portion 121 of the tray member is disposed adjacent to the liquid inlet 100 and extends from the liquid inlet region downstream in the direction of the tray diametrical streamline $d$—$d$ and extends transversely outwardly from the tray diametrical streamline to the perimetric regions of the tray adjacent the extremities of the bubble promotor at the end of the tray member. The first band portion is characterized by angular orientation of the slot openings 123 therein with respect to and away from the tray diametrical streamline $d$—$d$ such that the slot angle of individual slots in this band portion is greater than the angle formed by the diametrical streamline and a tangent line $t$—$t$ at the tray member outer edge at the point of intersection with the liquid inlet 100. The first band portion is also characterized by uniform distribution of fixed size perforation openings 122 across the band portion main flat top surface. In the embodiment as illustrated the slot angle of individual slots in the tray member first band portion is approximately 62° as measured by the included angle between the slot vector $v$—$v$ for the slot openings and the diametrical streamline $d$—$d$. As mentioned, under the broad practice of the present invention, the slot angle of individual slots in the first band portion must be greater than the angle formed by the diametrical streamline and a tangent line at the tray member outer edge at the point of intersection with the liquid inlet. In the FIG. 2 embodiment the angle formed by the diametrical streamline $d$—$d$ and tangent line $t$—$t$ at tray member outer edge at the point of intersection with the liquid inlet 100 is 49°. It has been discovered that this relationship between the magnitude of slot angles in the first band portion of the tray member and the angle between the diametrical streamline and the tangent line to the point of intersection of the tray member outer edge with the liquid inlet is necessary to effectively propel a substantial quantity of the introduced liquid toward the perimeter of the tray in the inlet region and that such displacement of liquid in the inlet region, towards the outer periphery of the tray, effectively overcomes the liquid maldistribution problem which has characterized side-to-center two pass sieve trays of the prior art.

Under the foregoing considerations, the first band portion of the tray member must extend from adjacent to the liquid inlet downstream for a distance at least 20 percent of the length of the tray diametrical streamline from the liquid inlet to the tray transverse center line and must extend transversely outwardly from vicinity of the tray diametrical streamline for a distance at least 25 percent of the transverse length of the liquid inlet, in order to propel sufficient quantity of introduced liquid toward the tray perimeter. As used above, the transverse length of the liquid inlet means the transverse linear distance between the points of intersection of the tray member outer edge with the liquid inlet; as applied to the FIG. 2 embodiment, the transverse length of the liquid inlet is simply the cord defined by the downstream edge of the liquid inlet 100, adjacent to bubble promotor 114. As indicated earlier herein, the tray transverse center line for a two pass, side-to-center flow tray of the type shown in FIG. 2 is the maximum transverse extent of the tray member along a line perpendicular to the diametrical streamline and is coincident with the downstream edge of the tray member, adjacent to the liquid discharge. If the downstream extent of the first band portion of the tray member is less than 20 percent of the length of the tray diametrical streamline from the liquid inlet to the tray transverse center line, an insufficient liquid residence time on the first band portion is provided for propulsion of liquid toward the tray periphery, and as a result, the liquid maldistribution problem on the tray is not satisfactorily overcome. In addition, if the transverse outward extent of the first band portion from vicinity of the tray diametrical streamline is less than 25 percent of the transverse length of the liquid inlet, an inadequate portion of the introduced liquid is subjected to the high angle slot zone, again with the result that the liquid maldistribution problem is not fully over come. In preferred practice, the tray member first band portion extends downstream from adjacent to liquid inlet for a distance of from 20% to 60% of the length of the tray diametrical streamline from the liquid inlet to the tray transverse center line and extends transversely outwardly from the tray diametrical streamline for a distance from 25 to 100% of the transverse length of the liquid inlet, under the foregoing considerations. The transverse extent of the first band portion can in practice exceed 100% of the transverse length of the liquid inlet, where the first band portion extends transversely to the periphery of the tray member. However, such extent, greater than 100%, is not desirable in practice inasmuch as it tends to overload the region of the tray member adjacent the periphery of the tray and may result in preferential channeling of liquid along the column wall at the tray periphery, with the result that tray efficiency is severely adversely affected. Also, as shown in the embodiment of FIG. 2, the first band portion of the tray member may suitably be substantially rectangular in shape, by way of facilitating fabrication of the tray.

The slot angle of individual slots in the tray member first band portion is desirably maintained in the range of from 50° to 90° to provide satisfactory transverse propulsion of the introduced liquid. Trays constructed in accordance with the present invention are most suitably constructed to provide an active area of at least 60%, based on the ratio of tray surface area available for effecting intimate contact between rising vapor and liquid flowing across the tray member and the overall area of the tray as based on the circular cross section of the column enclosing the tray. Preferably the active area of trays constructed in accordance with the present invention is at least 80%. At such relatively high active area levels, the liquid inlet becomes correspondingly smaller relative to the gas-liquid contacting area provided on the tray. At such relatively high active area levels, it is desirable to provide slot angle of the individual slots in the tray member first band portion of between 75° and 90°.

Further, under the present invention, the density of slotting in the first band portion is such that the ratio of the total area slot openings therein to the total active area for the first band portion is between 0.0001 and 0.30. The slotting density in the first band portion must lie within this range in order to provide the proper distribution of liquid at the inlet region of the tray member; at slotting density below 0.0001 there tends to be inadequate vapor thrust on the introduced liquid toward the outer periphery of the tray and at slotting density above about 0.30 the extent of vapor thrust on the introduced liquid to become excessive, with the aforementioned deleterious consequences of preferential channeling liquid adjacent the column wall at the periphery of the tray member. Within this range of slotting density, the specific slot density desirably employed in any given application will be determined by the physical properties of the fluids involved, expected gas-liquid loading levels and overall dimensions of the tray. Preferably, under the foregoing considerations, the ratio of the total area of the slot openings in the tray member first band portion to the total active area of the first band portion is between 0.001 and 0.20. Only a small degree of forward slotting vector component is needed in the first band portion of the tray member since the introduced liquid in that region has a substantially sufficient forward component of kinetic energy as it flows on to the tray to obviate the need for any additional substantial forward acceleration. Nonetheless it will be recognized that it may in some instances be desirable to intersperse a small number of forwardly oriented slots among the high angle slots in the first band portion, in order to insure a very high degree of uniform liquid distribution on the first band portion, and that such modification is contemplated as being within the broad scope of the present invention.

The tray member first band portion 121 in the FIG. 2 embodiment is bounded at its transverse outer extremity by adjacent second band portion 124A and 124B of the tray member extending transversely to the tray member outer edge and downstream coextensively with the first band portion and beyond same to the tray transverse centerline C—C at the downstream edge of the tray member adjacent to the liquid discharge. The second band portion each have a multiplicity of uniform diameter perforations 125A and 125B respectively distributed across the top main surface thereof. The second band portions also have angular orientations of slot openings therein with respect to and away from the tray diametral streamline such that the slot angle of individual slots 126A and 126B respectively is between 30° and 45°. The density of slotting in the second band portions is such that the ratio of the total area of the slot openings therein to the total active area of the second band portions is between 0.0001 and 0.30. The reason for the limits of slotting density for the second band portion is substantially the same as the reason for the limits of slotting density in the first band portion; at slotting densities below about 0.0001 inadequate vapor thrust is unoarted to the liquid flowing across the second band portion with the result that there is liquid maldistribution, in the form of flow stagnation on the second band portion and at slot density values above about 0.30 excessive vapor thrust is imparted to the liquid flowing on the second band portion with the result that liquid retention time on the second band portion is reduced below desirable levels with inadequate degree of gas-liquid contacting thereon. The slot angle of the slots in the second band portion as shown are approximately 40°. Under the foregoing constraints, the slot utilized near the perimeter of the tray in the second band portion have relatively large force vector components in the flow direction so that the liquid does not tend towards stagnation near the column wall.

In the FIG. 2 embodiment, the tray member first band portion extends distance only part of the length of the tray diametral streamline from the liquid inlet 100 to the tray transverse center line C—C and is bounded at its downstream extremity by an adjacent transversely extending third band portion 127 of the tray member extending downstream to the tray transverse center line C—C, and having lower slot density than the above described first and second band portions 121, 124a and 124b. The slotting component in the third band portion is such that the hydraulic gradient on the tray is eliminated depending upon the fluid physical properties, expected gas-liquid loading levels and overall tray dimensions, more or less slotting than that shown in FIG. 2 may be necessary in a given application, and, indeed, it may be desirable in some applications to provide the third band portion of the tray member as an unslotted section thereof. If slotting in the third band portion is necessary the slot density on that portion is relatively low. Due to the effective hydraulic distribution of liquid on the tray member main top surface, as due primarily to the high angled slotting first band portion, and to a lesser extent to the slotted second band portions, the slot angle of slots in the third band portion is preferably low in magnitude, less than about 15° with respect to the tray diametral streamline. In the FIG. 2 embodiment the slot angle is 0° uniformly across the third band portion. As an example of the open area characteristics of the tray described above, the perforation density for each of the first, second and third band portions, defined as the open perforation area of a particular band portion expressed as a fraction of the total active area of that particular band portion, is 0.124 for each of the three band portions. The slotting density, defined as the ratio of the total area of slot openings in a given portion to the total active area of that band portion, is 0.008 for each of the first and second band portions, and is 0.004 for the third band portion.

FIG. 3 is a plan view of one-half of another double pass, side to center-flow slotted sieve tray according to the invention, suitable for use in the FIG. 1 tray assembly in the upper tray thereof. As in the previously described embodiment, the tray member has main flat top and bottom surfaces on which liquid flows on the top surface thereof across the tray from a liquid inlet 140 at one edge of the tray member along a liquid flow path on the main top surface including a diverging flow section adjacent the inlet to a liquid discharge at an opposite edge of the tray member extending transversely from edge to edge of the tray along the tray transverse center line at the downstream edge of the tray member. The liquid inlet 140 extends transversely and is parallelly oriented with respect to the liquid discharge. A plurality of fixed size perforation openings are distributed across the tray member and extend therethrough with walls normal to the main flat top and bottom surfaces for gas flow therethrough. A plurality of elevated portions formed from the tray member are provided across the surfaces each with an upper surface raised from the main flat top surface having a front leading edge separated from the main flat top surface to form an elongated slot opening therewith of greater width than height. The raised upper surface is inclined to the main flat top surface and has a back edge integral with such surface and each elevated portion is spaced from adjacent elevated portions by the main flat top surface entirely surrounding such elevated portion.

In this illustrative tray a bubble promoter 141 is disposed adjacent the liquid inlet 140, in the same manner as previously described. The active gas-liquid contacting area of this tray comprises a series of discreet tray panels which are contiguously joined to form the tray member as shown. For ease of description in the following discussion, the discreet tray panels of the tray member have each been separately numbered. The first band portion of the tray member in this embodiment comprises discreet panels 143a–j. The angular orientation of slot openings in the first tray portion is uniform in all constituent panels, at a value of 75°. The slotting density is uniform for all constituent panels in the first band portion, with a ratio of the total area of the slot openings therein to the total active area of the first band portion of 0.02. The constituent panels 144a–c and 144d–f, extending from the downstream extremity of the first band portion to the tray transverse centerline at the liquid discharge, as well as the central panel 144d extending from the bubble promoter 141 downstream to the tray transverse center line, all have a 0 slot density, i.e., are unslotted. Panels 142 a through d disposed between bubble promoter 141 and the upstream extremities of first band portion panels 143d–g, are also unslotted, and serve the same purpose as similar panels in the FIG. 2 embodiment, that is, to eliminate spraying and liquid entrainment. The perforation density of the fixed size perforation openings is uniform across the entire active area of the tray member, and has a value of 0.124 square feet total area of perforation openings per square foot of active area of the tray member.

As mentioned earlier herein, it is frequently not desirable to employ high slot angles in the region adjacent the transverse periphery of the tray member, since such high slotting may direct liquid to adjacent the column wall and lead to channeling adjacent the column wall surface and lowered efficiency for the tray. Nonetheless, such high slot angles may advantageously be used near the transverse periphery of the tray member in the FIG. 3 embodiment for large diameter trays wherein there is a high level of divergence of the liquid flow from the liquid inlet to the liquid discharge of the tray. In this regard, as applied to a two-pass, side-to-center flow type of sieve tray, the present invention has particular utility in trays having a diameter greater than about 10 feet. With such large trays the problem of liquid maldistribution normally associated with the diverging inlet portion of the tray is exacerbated and normally is severely detrimental to the overall efficiency attained by the contacting tray. The slotting pattern shown in the FIG. 3 embodiment is based on a tray having a diameter of 20 feet. On such a large diameter tray the transverse peripheral high angle slotting panels 143a, b, i and j, serve to spread the inlet liquid uniformly over the full width of the tray, in conjunction with the high angle slotting panels 143d–g.

The slotting configuration shown in FIG. 3 differs from the slot configurations previously described in that the tray member first band portion in the FIG. 3 embodiment comprises two discreet band segments each disposed adjacent the liquid inlet, transversely spaced apart from one another and symmetrically aligned with respect to the tray diametral streamline d—d. In such modification, wherein the band portion comprises two discreet band segments, the respective segments should be spaced apart from one another by distance no more than 50% of the transverse length of the liquid inlet. The purpose of such constraint is to avoid preferential channeling of liquid from the liquid inlet to the liquid discharge at large transverse distances from the tray diametral streamline, such as would cause liquid maldistribution problem sought to be overcome by means of the present invention.

Figure 4:
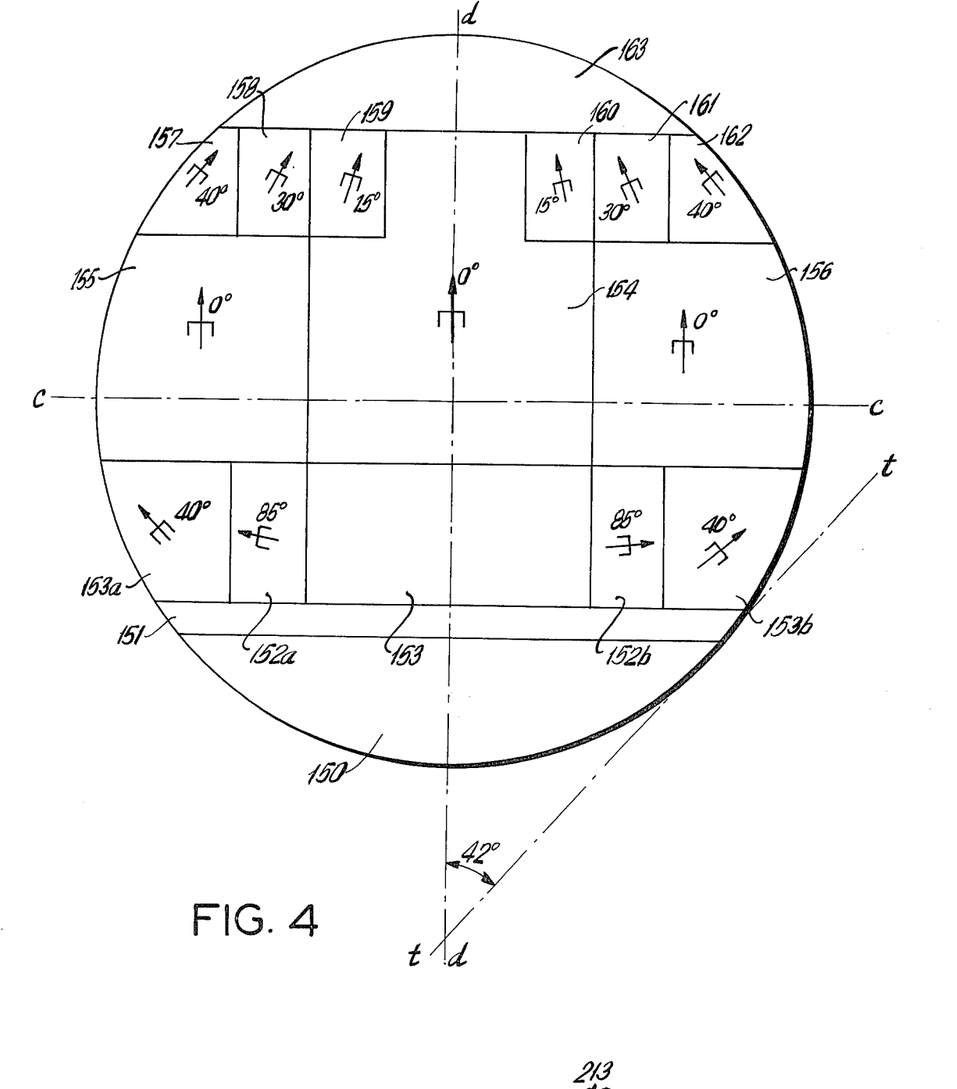
FIG. 4 is a plan view of a single-pass, cross-flow slotted sieve tray according to the invention.

FIG. 4 is a planned view of a single pass, across flow sieve tray according to the invention. The FIG. 4 tray is of a simple cross flow type wherein the liquid flow path on the main flat top surface includes a converging flow section adjacent to the liquid discharge 163. The tray includes a liquid inlet 150, which occupies about 34% of the total tray area upstream of the tray transverse center line c—c. A bubble promoter device 151 is disposed adjacent to the liquid inlet and upstream of the slotted tray member panels forming the major portion of the tray member surface. As in the previously described embodiment of FIG. 3, the tray member first band portion comprises two discreet band segments, panels 152a and 152b each disposed adjacent the liquid inlet and spaced apart from one another by the unslotted panel 153. As indicated in connection with the FIG. 3 embodiment the segments of the first band portion should be transversely spaced apart from one another by a distance no more than 50° of the transverse length of the liquid inlet. This embodiment thus represents a configuration approaching that practical maximum separation distance, which is permitted by the extremely high slotting angles of 85° in the first band portion segments of 152a and 152b.

The tray member first band portion segments are abounded at their transverse outer extremeties by adjacent second band portions of the tray member, panels 153a and 153b, extending transversely to the tray member outer edge and downstream coextensively with the first band portion segments. The second band portions have angular orientation of the slot angle therein with respect to and away from the tray diametral streamline such that the slot angle of individual slots is 40°. The slotting configuration shown in FIG. 4 is based upon a tray of diameter 11.5 feet. Downstream from above described first and second band portions are disposed a multiplicity of slotted band portions constructive in accordance with the aforementioned Matsch patent U.S. Pat. No. 3,759,498. The downstream band portions include panels 154, extending downstream to the liquid discharge 163, and panels 155 and 156 located on either side of the central panel 154 and extending downstream only part way toward the liquid discharge. Each of these downstream three panels is slotted with slots having a 0° slot angle. In the downstream corner region of the tray adjacent to the liquid discharge, are disposed the adjacent panels 157, 158 and 159, having slot angles of 40°, 30° and 15°, respectively in the lefthand corner; in the right hand corner are disposed the adjacent correspondpanels 160, 161 and 162, having slot angles of 15°, 30° and 40° respectively.

The embodiment of FIG. 4 suitably employs varying density of fixed size perforation openings in the tray member across the surfaces thereof. In the broad practice of the present invention, depending on the fluids involved and the expected liquid loading levels, trays of the present invention may advantageously employ slotting densities in the inlet zone much higher than has been practiced heretofore on trays constructed in accordance with the teachings of the prior art. In fact, slotting densities levels substantially equivalent to the total opened area of such prior art trays may advantageously be employed to insure maximum tray efficiency of trays constructed according to the present invention. If such a high slotting density is punched onto an already perforated panel of the tray member, perforated to the desired opened area of the entire tray member surface, the panel will have an opened area about twice that of the remaining deck. As a result of such variation in opened area, upwardly flowing vapor may preferentially flow through this region during operation of the tray leading to the excessive inlet spraying and areas of inactivity on the remaining tray member surface. Therefore, in such circumstances, it is desirable to alter the perforation density so that a substantially uniform opened area exists on each tray panel constituent of the tray member. The exact choice of when to employ such variable perforation density with the high angle inlet slotting of the present invention is a question of economics, as based on considerations of the cost of perforating various panels with various densities as compared with the economic operating penalty incurred in the loss of efficiency and the resulting loss in degree of separation, or, alternatively, the cost of additional contacting trays in the column to perform the desired separation.

The above described variable perforation technique may advantageously be employed in the broad practice of the present invention in those circumstances when it is desirable to minimize the extent of surface area of the high slot angle first band portion. In some instances, it may be desirable to impart a very large propulsive force to the liquid over a very short distance of the tray surface adjacent the inlet. By reduction of the perforation density in the first band portion, with simultaneous increase in the slotting density therein, maintaining the same open area, the same degree of propulsive force can be imparted to the liquid by a correspondingly smaller surface area of the tray member.

In general, the open area of a gas liquid contacting sieve tray member can vary within the range of about 0.01% and 30.0%, although the fractional open area is typically substantially constant for any given tray over all zones or band portions of the tray member. Both the fixed size perforations and slots contribute to the open area of the tray members. For any given tray member panel, the percent open area thereof can be expressed by the following equation $f_c = C_s f_s + C_b f_p$ where $f_s$ equals total area of the slot openings expressed as a fraction of the total active area of a given band portion; $f_p$ equals total area of the perforations expressed as a fraction of the total active area of a given band portion; $C_s$ equals orifice coefficient of the slot; $C_p$ equals orifice coefficient of the fixed size perforations; and $f_c$ equals total orifice coefficient weighted open area expressed as a fraction of the total active area of a given band portion. For a slotted sieve tray fabricated in accordance with the present invention, the open area of band portions of the tray members may vary somewhat from one another. To take this variation of open area into account, therefore, a weighted average open area for the tray members can be expressed by the following formula:

$$\sum_{i=1}^{N} \frac{A_i(C_s f_s + C_p f_p)_i}{A_T} = \sum_{i=1}^{N} \frac{A_i f_{ci}}{A_T} = \overline{f_c}$$

Where

N = number of band portions forming the tray member active area;
$A_i$ = total area of the ith band portion;
$A_t$ = total active area of tray member; and
$\overline{f_c}$ = orifice coefficient weighted average open area for the tray member.

In the practice of the present invention, in order to maintain proper hydraulic operation without incidence of vapor bypassing through the tray or liquid weeping therefrom, it has been determined that the orifice coefficient weighted open area of any given band portion, particularly the first band portion, should not vary more than 25% from the average overall weighted open area of the tray member. As a consequence of the foregoing determination, it may be desirable to vary the perforation density fraction from band portion to band portion on the tray member, depending on relative magnitude of slot density fraction of the various band portions and the desired tray member open area.

In line with the foregoing discussion, illustrative variable perforation density, slot density and area characteristics for a tray of the type shown in FIG. 4 are summarized below in Table I, which shows surface area for each of these band portion panels of the tray, together with perforation densities, slot densities, perforation or of its orifice coefficients, slot or of its coefficients and weighted open areas of each of the panels expressed as a fraction of the total active area of the given band portion.

this tray is 0.078 which as is apparent from the values of fractional opened area of band portion panels set forth in Table I, is very close to the fractional opened area for any individual panel of the tray member.

Figure 5:
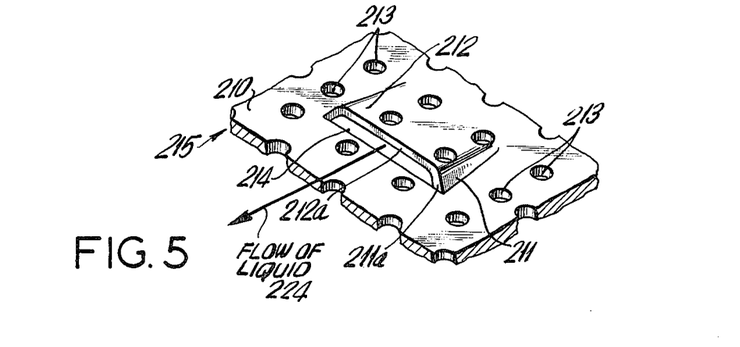
FIG. 5 is an isometric view of a portion of an exemplary tray according to this invention, showing the relationship between the fixed size openings with walls normal to the tray surface, and a slot with side walls forming acute angles with the tray member main flat top surface.

FIG. 5 is an isometric view of a portion of an exemplary tray according to this invention, showing the relationship between the fixed size openings with walls normal to the tray surface, and a slot side walls forming acute angles with tray member main flat top surface. This is a preferred slot opening construction which may be used to form variable slot density and slot angle trays according to the invention. Situated on main flat surface 210 are a number of fixed size openings or perforations 213 normal to surface 210 and extending through the tray member 215. Also on the main flat surface 210 are a number of elevated portions formed from the tray member having a top surface 212 inclined to the main flat surface 210 and integral therewith. These elevated portions also have sides 211 which are also inclined to the main flat surface 210 and integral therewith. The top surface 212 and the inclined sides 211 have leading edges 212a and 211a respectively above the main flat surface 210. The flat surface just below leading edge 212a and the leading edges 211a of inclined sides 211 are situated such that they form an aperture or slot 214 having an aperture plane which may be normal to the main flat surface 210 or slightly inclined thereto, depending upon the manner in which the elevated portions are initially formed.

TABLE I

Open Area and Active Area Characteristics of a Tray of the Type Shown in FIG. 4 Employing Variation Perforation Densities

| Band Portion Panel Number | Total Panel Surface Area, ft² | Fractional Perforational Density, $f_p$ | Perforation Orifice Coefficient, $C_p$ | Fractional Slot Density, $f_s$ | Slot Orifice Coefficient, $C_s$ | Weighted Fractional Open Area of Band Portion Panel, $f_c$ |
|---|---|---|---|---|---|---|
| 151 | 3.3 | 0.07 | 0.66 | 0.0 | — | 0.046 |
| 153 | 7.9 | 0.11 | 0.66 | 0.0 | — | 0.073 |
| 152a, b | 4.7 | 0.07 | 0.66 | 0.05 | 0.68 | 0.080 |
| 153a, b | 6.0 | 0.07 | 0.66 | 0.05 | 0.68 | 0.080 |
| 154 | 15.1 | 0.11 | 0.66 | 0.005 | 0.68 | 0.076 |
| 155, 156 | 17.4 | 0.11 | 0.66 | 0.01 | 0.68 | 0.079 |
| 159, 160 | 4.6 | 0.11 | 0.66 | 0.01 | 0.68 | 0.079 |
| 158, 161 | 4.7 | 0.07 | 0.66 | 0.05 | 0.68 | 0.080 |
| 157, 162 | 5.3 | 0.07 | 0.66 | 0.05 | 0.68 | 0.080 |

The design value of the orifice coefficient weighted fractional open area of the tray member for the tray shown in FIG. 4 and described in Table I is approximately 0.07. If this tray were to be fabricated by conventional prior art technique, a uniform distribution of fixed size perforations would be provided in each of the band portion panels, and any parts required by the hydraulic design would be superimposed over such uniform density perforations pattern. However, at the required slotting density value as listed in Table I, such a conventional fabrication procedure would result in some tray member panels, such as 152a, b, 158, 161, 157 and 162, having open areas approximately 33 percent and 45 percent higher than panels 155 and 156 and 159 and 160, and 153 and 154 respectively. As indicated earlier herein, it has been found that such variation in panel open areas results in tray member regions of excessive spraying and weeping, which are known to be highly detrimental to efficient tray operation. As a result of the foregoing considerations, in those panels of the tray requiring high slot densities, panels 152a, b, and 153a, b, 158, 161, 157 and 162, the perforation density has been correspondingly reduced relative to that which is employed by the prior art, so as to maintain a substantially uniform fractional open area over the tray member. The average overall weighted open area for In operation, a process vapor or gas flows only through perforations 213 and slot 214. A portion of the vapor passing through the perforations 213 normal to the tray surface 210 proceeds through a process liquid contained on the tray and forms bubbles while passing through the process liquid.

In this manner intimate contact with liquid and vapor is achieved. The vapor passing through slot 214 does not leave the surface of the tray normal thereto as does vapor passing through perforations 213. Instead, the vapor impinges on the lower side of slot top surface 212 and directed obliquely into the process liquid. In this manner the underside surface acts as a gas flow directing surface. It should also be noted that the slot opening 214 functions as a throat, i.e., it converts pressure drop to kinetic energy. The kinetic energy or vapor thrust associated with this portion of the vapor is at an angle to the tray surface 210. This inclined force vector may then be resolved into its horizontal and vertical components. The horizontal component is directed into and absorbed by the process liquid thereby causing the process liquid to flow in the direction 224.

The sizes of perforations 213 and slot 214 depend on the flow requirement for a particular liquid-gas system, as will be understood by those skilled in the distillation art. For example, perforations diameters of 0.015 to 0.125 inch are satisfactory for air separation application, but larger diameters up to about 0.25 inch may be preferred for other gas-liquid systems. The perforations are most conveniently formed by punching holes through a metal sheet, and for mechanical reasons sheet metal cannot be thicker than the punched hole diameter. Perforations of diameters smaller than 0.015 inch will generally necessitate the use of a tray material which is too thin to provide level support for the liquid. A further disadvantage also results if the perforation diameter is less than 0.015 inch, i.e., the pressure drop across trays becomes inordinately high and power loss is increased. On the other hand, if the perforations are excessively large in diameter, normal vapor loadings would be insufficient to keep the tray from weeping, thereby reducing tray efficiency. Although the perforations 213 need not be of circular cross section, this configuration is preferred from standpoints of manufacturing ease and minimum pressure drop.

For satisfactory performance, the slots and perforations are suitably sized to exhibit a wet tray pressure drop ($\Delta H_w$) of between 0.05 and 0.5 inch of column liquid. As used herein "wet tray pressure drop" is the resistance to vapor flow through the slot perforations due to surface tension of the liquid at incipient bubbling conditions, exclusive of hydrostatic head. For best performance, $\Delta H_w$ for the slots should be somewhat less than for the perforations and preferably should be between 70% and 100% of the $\Delta H_w$ for the perforations.

The trays of this invention are preferably manufactured by first punching uniformly sized circular perforation openings through a sheet member in a suitable distribution, which as indicated may be uniform or non-uniform as necessary or desirable for the given application, across the sheet top and bottom surfaces. Next, the perforated sheet is cut in band members of the desired shape and size. Discreet rectangular portions of the perforated band members are deformed therefrom by the application of force to one surface of such members so that the portions are elevated from the main level of the opposite surface which now becomes the main flat top surface of the tray band portion. Each of these elevated portions is entirely surrounded by the main flat top surface, and each has a raised top surface inclined obliquely to the main flat top surface. A front edge is then sheared from each elevated portion to form an elongated aperture plane, i.e., slot of greater width than height, containing the edges of the sheared material. In practice, all of the elevated portions and slots of a particular band portion are preferably oriented in the same direction and are formed at the same density across the band portion area. The slot orientation and density for different band portions of the tray member of course vary in accordance with this invention. The various band portions are then assembled in the desired tray pattern so as to form a continuous tray member gas-liquid contacting surface with the edges of adjacent band members contiguously positioned, and the various band portions are finally mechanically joined together to form the tray member.

Figure 6:
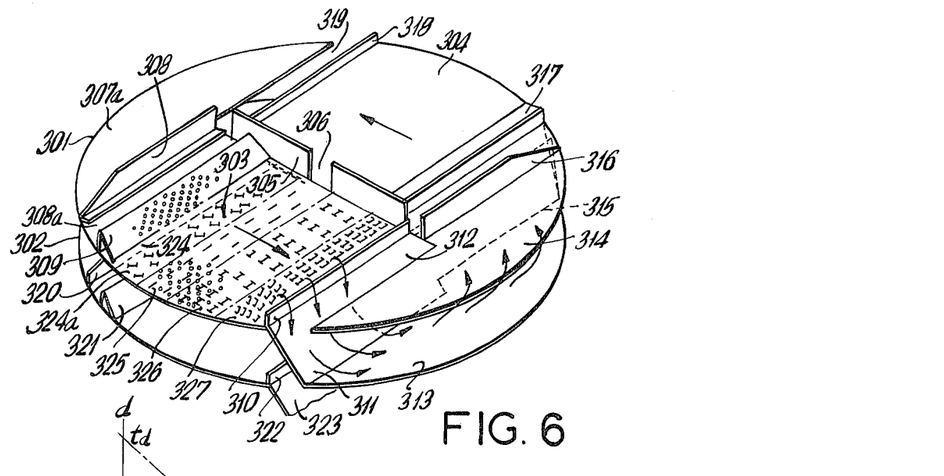
FIG. 6 is an isometric view looking downwardly on two slotted sieve trays according to the invention of the parallel flow type.

FIG. 6 is an isometric view looking downwardly on two slotted sieve trays according to the invention, of the parallel-flow type. As in the FIG. 1 embodiment, the column walls have been omitted from the figure, but it is again to be understood that the circular edges of the trays are sealed substantially leak-tightly against the vertical wall of the cylindrical column. The trays are of the parallel-flow type wherein the liquid flowing down the column is divided into two streams — one stream occupying one-half the tray and the other the opposite half. The paths of the two streams form a double helix because the liquid overflowing from each half of the tray crosses over in the downcomer and enters the next tray below on the opposite side of the column. A result of the double helical flow pattern is that liquid flow on one-half of a tray is in opposite direction to that on the other half, as indicated by arrows on the figure, and the inlet of one side of a tray is adjacent the outlet of the other side.

Thus, tray 301 is divided into half-tray 303 on which liquid flows forward and to the right in the figure, and half-tray 304 on which liquid flows away and to the left. The two streams are separated by diametral wall or center baffle 305 whose height is less than the tray spacing to achieve uniform gas distribution between adjacent half-trays. The opening 306 in the center of wall 305 serves to equalize the volumes and fluid depths of the two streams on the tray so that liquid imbalance cannot accumulate from tray to tray.

One-half of the liquid stream flowing down the column enters half-tray 303 from downcomer pan 307a by first flowing over preliminary weir 308 and then downwardly over sloped surface bubbling promoter 309. Preliminary weir 308 serves to distribute the liquid uniformly along the channel 308a between the preliminary weir and the bubbling promotor 309. This redistribution is highly desirable in the parallel-flow tray because the liquid turns 180° in the downcomer and momentum effects can otherwise produce unequal distribution of the stream along the crest of the bubbling promotor 309. The height and edge contour of the preliminary weir can be adjusted to suit the specific momentum effects of a particular downcomer. In the FIG. 6 embodiment, the outer end of a preliminary weir 308 is tapered downwardly to induce relatively more liquid to enter the tray near the circumference and to avoid a liquid-deficient condition in that area.

Bubbling promoter 309 is a sloped weir with perforations only, on the sloped surface. Its form and function are in accordance with the aforementioned Bruckert et al. U.S. Pat. No. 3,282,576. As before, other bubble promoting means may be used at the liquid inlet, for example a lip-type restricted opening. The foam or froth created at promotor 309 flows across the main liquid-gas contact zone of half-tray 303, over outlet weir 310 and falls down sloped walls 311 of downcomer 312. Upon leaving the active area of the tray and entering the downcomer, vapor disengages from the liquid and continues upward to the next tray above. The clear liquid flows around downcomer pan 313 and under a gate 314 cut-away from the lower edge 315 of sloped downcomer wall 311. The liquid thereby gains entry to the far half of tray 302 (beneath half-tray 304), and flows in succession over a preliminary weir, a bubble promotor and across a main liquid-gas contact zone similar to those elements on half-tray 303.

While one-half the column liquid is flowing over half-tray 303, the other half is flowing over half-tray 304. This other half of the column liquid flows in succession over preliminary weir 316, bubble promotor 317, and the main liquid-gas contact zone of half-tray 304. After traversing the contact zone, it overflows weir 318 into downcomer 319 and drops to the level of tray 302. It then crosses over to the near side of tray 302 and enters the half-tray immediately beneath half-tray 303, flowing in succession over preliminary weir 320, bubble promotor 321, the main liquid-gas contact surface, outlet weir 322, and sloped downcomer walls 323.

In contrast to the double-helical flow path of the liquid, the column vapor flows substantially straight upward from tray-to-tray. It is prevented from bypassing through the downcomer by the sloped walls 311 whose lower edge 315 is immersed beneath the stream of liquid.

Figure 7:
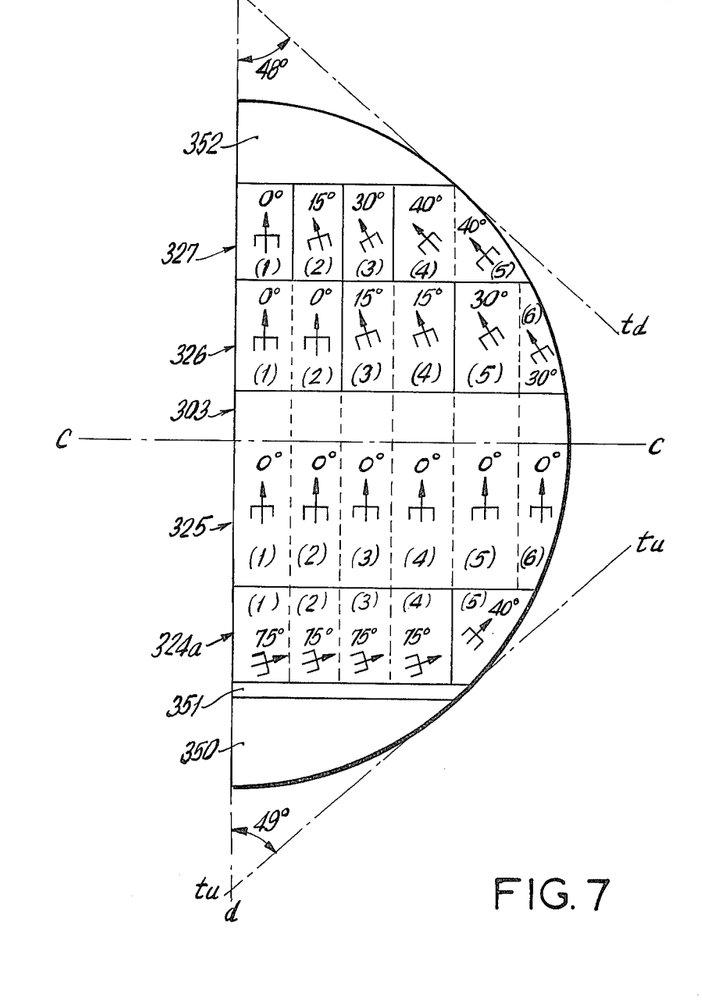
FIG. 7 is a plan view of one-half of a tray of a type suitable for use in the FIG. 6 tray assembly showing the band portions of different slot angular orientations.

FIG. 7 is a plan view of one-half of a tray of a type suitable for use in the FIG. 6 tray assembly showing the band portions of different slot angular orientations. This figure illustrates a preferred slotting pattern for a parallel-flow, cross-flow tray. As shown, the tray member part downstream of the tray transverse center line c—c is slotted in accordance with the teachings of Matsch U.S. Pat. No. 3,759,498. In the slotting arrangement as taught in the Matsch patent, at least some of the slot openings in the tray member downstream of the tray transverse center line are angularly oriented with respect to and toward the tray diametral streamline such that: (a) the slot angle of individual slots increases in the transverse direction to the liquid flow path from the diametral streamline to the tray outer edge, (b) the slot angle of individual slots also increases in the longitudinal direction of the liquid flow path to the liquid outlet, and (c) the slot angle of individual slots immediately adjacent the liquid outlet and the tray active surface outer edge at the point of intersection with the liquid outlet is within 20° of the angle formed by a tangent line at the point of intersection and the diametral streamline. In the illustration half-tray 303, liquid is introduced to the tray member main flat top surface on the liquid inlet 350, which may be an unslotted imperforate section of the main tray surface disposed immediately beneath the downcomer means communicating with the next overlying tray. From the liquid inlet 350, the introduced liquid transverses the transversely extending zone 351 which may suitably comprise a bubble promoting means of the aforementioned type mounted on the tray member main top surface. The liquid then flows in a diverging and converging flow pattern across the tray member surface active area slotted portion to the liquid discharge 352. The slotted inlet region of the tray member comprises a first band portion consisting of the panels 1, 2, 3 and 4, adjacent to a second band portion of the tray member extending to the tray periphery and coextensive in the downstream direction with the first band portion. The slot angle in all four panels in the first band portion is 75° and the slot angle of the second band portion is 40°.

Immediately downstream from the above-described first and second band portions of the tray member is the transversely extending third band portion, consisting of panels 1–6 in the panel row 325. The third band portion extends downstream to and slightly beyond the tray transverse centerline c—c. Downstream of the third band portion is the transversely extending panel row 326, comprising panels 1 and 2 having a slot angle of 0°, panels 3 and 4 having a slot angle of 15°, and panels 5 and 6 having a slot angle of 30°. The final panel row 327, adjacent the liquid discharge 352 for the half-tray, consists of panel 1 having a slot angle of 0°, panel 2 having a slot angle of 15°, panel 3 having a slot angle of 30°, and panels 4 and 5 each having a slot angle of 40°.

In the FIG. 7 half-tray, the angle formed by the diametral streamline $d$—$d$ and a tangent line $t_u$ — $t^u$ and the tray member outer edge at the point of intersection with the liquid inlet 350 is approximately 49°. By comparison the slot angle of slots in the band portion consisting of panels 1, 2, 3 and 4 in panel row 324a is 75°. At the opposite end of the tray, the angle formed by the diametral streamline $d$—$d$ and tangent line $t_d$ — $t_d$ at the tray member outer edge at the point of intersection with the liquid discharge 352 is approximately 48°, so that the slot angle of 40° for panel 5 in panel row 327 is within 20° of the angle formed by the diametral streamline and the downstream tangent, in accordance with the teachings of the aforementioned Matsch. The slot angle of slots in the first band portion of the tray member is greater than the angle formed by the diametral streamline and the upstream tangent, as required under the present invention.

Figure 8:
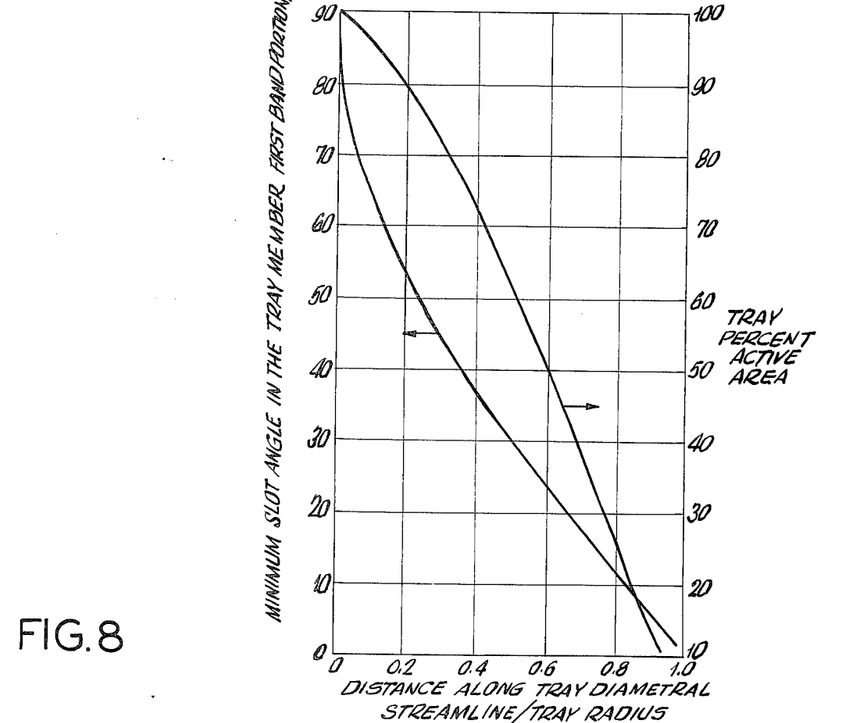
FIG. 8 is a graph in which minimum slot angle in the tray member first band portion and tray percent active area are plotted as functions of the distance along the tray diametral streamline from the tray perimeter to the tray liquid inlet.

FIG. 8 is a graph in which minimum slot angle in the tray member first band portion and the percent active area are plotted as functions of the distance along the tray diametral streamline from the tray perimeter to the tray liquid inlet. The graph is based on geometric analysis of a single-pass, cross-flow tray as based on an assumption of equal inlet and liquid discharge tray member surface areas. The distance along the tray diametral streamline contained in the numerator of the parameter plotted in FIG. 8 along the x-axis actually represents the maximum longitudinal distance between the tray perimeter and the downstream edge of the liquid inlet and, therefore, represents the amount of tray surface area which is devoted to the liquid inlet and thus is not available as active surface of the tray member for gas-liquid contacting. The parameter plotted along the x-axis desirably has a value which is no greater than about 0.5 corresponding to a 60% active area tray constructed in accordance with the present invention, so as to effectively utilize the high inlet slotting configuration provided thereunder. At tray active area values less than about 60%, the liquid introduced on to the tray member experiences only a comparatively low level of divergent liquid flow expansion in traversing the tray. Under such conditions, the problems associated with liquid maldistribution on the tray member in the inlet region is not excessive and only a low level of improvement is realized by implementing the high slot angle first band portion tray configuration of the present invention. The percent active area for trays constructed in accordance with the present invention is desirably at least 70% and preferably at least 80%.

The curve on the left hand side of the FIG. 8 graph represents the included angle formed by the diametral streamline and a tangent line at the tray member outer edge, at the point of intersection with the liquid inlet, i.e., the minimum slot angle which the slot in the tray member first band portion must exceed in accordance with the present invention. As shown by the graph, for an 80% active area tray constructed in accordance with the present invention, the minimum slot angle in the tray member first band portion is about 43°. As indicated earlier herein, the slot angle of individual slots of the tray member first band portion is desirably in the range of 50° to 90°, and preferably between 75° and 90°.

Figure 9:
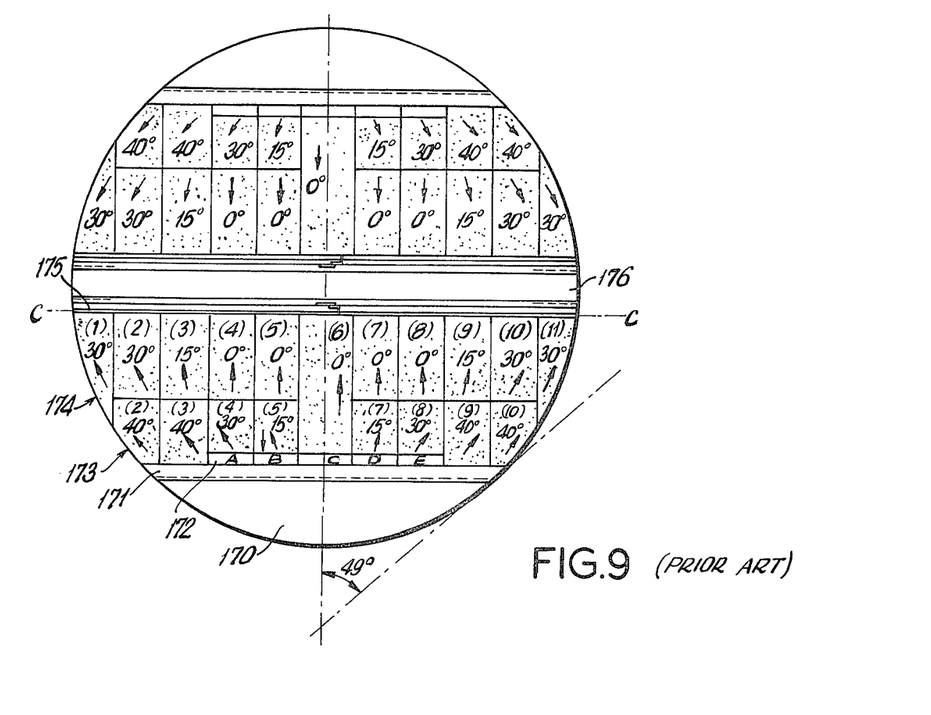
FIG. 9 is a plan view of a double-pass, side-to-center flow slotted sieve tray constructed in accordance with the prior art for comparison of performance with the tray shown in FIG. 2.

FIG. 9 is a plan view of a double-pass, side-to-center flow slotted sieve tray constructed in accordance with the prior art for comparison of performance with the trays shown in FIG. 2 herein. The FIG. 9 tray features a slotting pattern in the inlet region of the tray characterized by relatively low slot angles, as compared to the slot angles required in accordance with the present invention. Such pattern is consistent with the prior art teaching of providing slots in the inlet region of a cross flow tray which more or less follow the hypothetical liquid streamline along the flow path. Such configuration has been evaluated in practice and found to exhibit comparatively poor performance behavior with low tray efficiency, as associated with a remaining maldistribution problem on the tray at the inlet region thereof.

Regarding the structural characteristics of the FIG. 9 tray in greater detail, which regard to the lower half section as illustrated, the tray comprises a liquid inlet 170 which is parallelly aligned with liquid discharge 176 located at the opposite side of the tray. Immediately downstream from the liquid inlet 170, a bubble promoter 171 is provided. Adjacent to the bubble promoter 171 is a row of unslotted tray member segments A through E. A first row 173 of higher slot angle panels 2 through 5 and 7 through 10 is provided adjacent to the aforementioned bubble promoter. The slot angles in panels 2, 3, 9 and 10 is 40°, slot angles in panels 4 and 8 is 30°, and the slot angles in panels 5 and 7 is 15°. In the vicinity of the tray diametrial streamline, the longitudinally extending panel 6 extends from adjacent the liquid inlet to the liquid discharge 176. The second row of panels 174 comprises adjacent panels having relatively lower slot angles as compared with the upstream row of panels 173. In row 174 panels 1, 2, 10 and 11 have a slot angle of 30°; panels 3 and 9 have a slot angle of 15°, and panels 4 through 8 have a slot angle of 0°. The upper half of the illustrated tray is constructed symetrically with respect to the lower half tray just described. The tray member for the FIG. 9 tray has a perforation density of 0.124 on all constituent panels making up the tray member. The slot density is also uniform on all panels of the tray member, with a value of 0.002 square inches of slot open area per square inch of tray active area.

The tray as described above in connection with FIG. 9 was tested against a tray similar in type to that shown in connection with FIG. 3 herein, in order to demonstrate the performance advantages of the latter tray constructed in accordance with the present invention. These tests were carried out with an air-water contact system in a 20 foot diameter test column. Air was supplied to the column by 600 horse power blower with a capacity of 131,000 actual cubic feet per minute and 14.3 inches water static discharge pressure. A recirculating water system was provided with a capacity of 2500 gallons per minute (gpm). A means was provided for injecting a distinct line of dye into the froth at the tray inlet and viewing windows were provided in the column wall for determining fluid flow profile and retention times on the respective trays tested.

A tray substantially identical to that shown in FIG. 9 was evaluated in the air-water contacting system at an F-factor of 0.26 ft./sec. (16/ft.$^3$) $\frac{1}{2}$ and a liquid loading of 0.105 cubic feet per second per foot of weir. A ramp type promotor was employed at the tray inlet to initiate bubbling on the tray surface. In the operation of this tray, the liquid moved rapidly down the tray center line, but it flowed comparatively more slowly in areas of the tray near the column wall. The minimum residence time as measured at the tray center line was 2.5 seconds, while the maximum residence time of the liquid was 12.5 seconds. The residence time ratio of maximum residence time to minimum residence time for this tray was 5.0. Such residence time ratio provides a good quantitative measure of the uniformity of fluid flow distribution on the tray member surface. The residence time ratio which is required for good hydraulic behavior, i.e., close approach to plug flow, on the tray surface has been determined to be in range of from about 1.0 to 2.0. As compared with such values, the residence time ratio for the FIG. 9 tray, at 5.0, was well above the satisfactory range, evidencing that the problem of uniform liquid flow distribution on the tray had not been overcome even though the FIG. 9 tray employs angled slots at the inward region of the tray coincident with the geometrical liquid flow path streamlines therefor.

Figure 10:
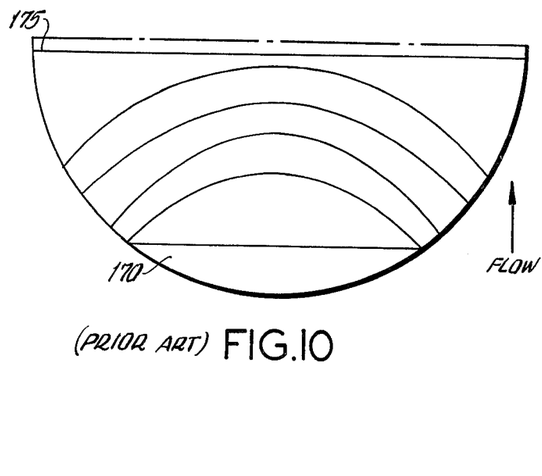
FIG. 10 is a flow distribution diagram for a tray member of the FIG. 9 tray.
Figure 11:
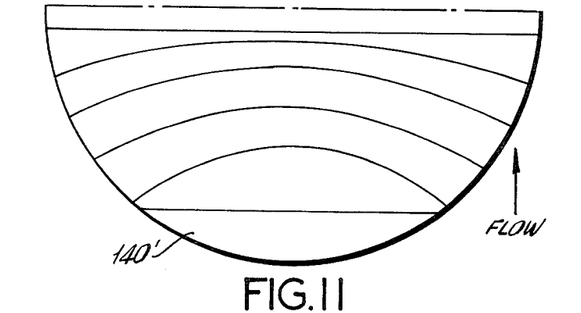
FIG. 11 is a flow distribution diagram for a tray member of the FIG. 2 tray.

For comparison with the above-described tray constructed in accordance with the principles of prior art, a tray designed and constructed in accordance with the present invention was likewise tested under similar operating conditions. This tray was substantially identical in configuration to the tray shown in FIG. 3 herein, but with the exception that the slotting angles zones 143A, 143B, 143I and 143J were 40° rather than the 75° slot angles shown. The tray had a perforation density fraction of 0.124 on all tray panels and a uniform slot density of 0.008 on the slotted panels 143A/J. The maximum and minimum residence time for this tray according to the present invention were 3.5 seconds and 5.5 seconds respectively. As a result, the residence time maximum to minimum ratio for this tray was 1.57 seconds, well within the desired range of 1.0 to 2.0 and, unexpectedly, greatly superior in performance to the previously described tray of FIG. 9 constructed in accordance with the prior art. The liquid flow profiles determined by dye injection on the FIG. 9 tray is shown in FIG. 10. The liquid flow profile for the FIG. 3 tray modified with 40° slots in zones 143A, B, I, J is shown in FIG. 11. FIG. 10 shows the extremely arcurate profiles of the dye tracer front as contrasted with the relatively flatter dye tracer fronts in the FIG. 11 flow diagram. It is apparent from these flow diagrams that the tray corresponding to FIG. 11 provides a dramatic improvement in approaching ideal flow behavior for the liquid on the tray relative to the tray of the FIG. 10 flow profile.

In a further series of evaluations based on the above-described tests, the FIG. 9 tray was modified by blocking all the vapor slot openings in panels 4, 5, 6, 7 and 8 in panel row 174, and panels 5 and 7 in panel row 173. Such blockage was attempted in order to improve the performance of the FIG. 9 tray by minimizing the downstream vapor thrust associated with the slot openings in the vicinity of the tray diametral streamline where the liquid velocity is highest. At the same gas and liquid loading conditions as described above, the measured minimum and maximum residence time were 4.0 seconds and 12.0 seconds, respectively, resulting in a residence time maximum to minimum ratio of 3.0. The operating conditions for this tray were identical to those employed in the previous cases, as in all cases concerned above, a sloped surface inlet bubble promotion device was employed adjacent to the liquid inlet for the tray. Minimum and maximum residence times for the FIG. 3 tray were measured as 4.0 seconds and 8.0 seconds respectively. The residence time maximum to minimum ratio for this tray thus is 2.0 which is at the upper end of the preferred range of ratio values but is nonetheless substantially superior to either of the prior art trays treated.

Figure 12:
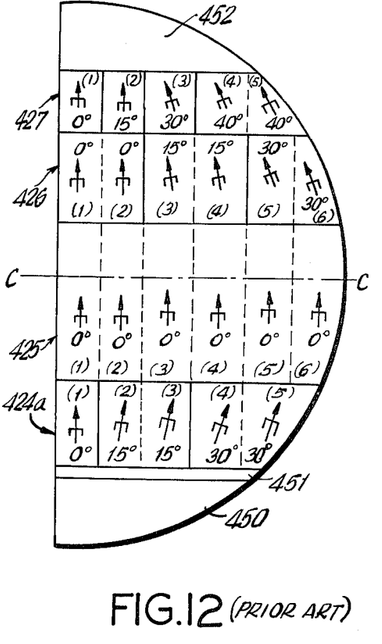
FIG 12 is a plan view of a parallel flow slotted sieve tray constructed in accordance with the prior art for comparison of performance with the tray shown in FIG. 7.

FIG. 12 is a plan view of a parallel flow slotted sieve tray constructed in accordance with the prior art teachings, for comparison of performance behavior with the tray constructed in accordance with the present invention as shown in FIG. 7. As is apparent from a comparison of trays shown in FIG. 7 and in FIG. 12, the difference between the two tray configurations is the slot angles used in the panels 1 through 5 of the panel row adjacent to the liquid inlet for the tray member. As shown, the panels 1, 2, 3, 4 and 5 in panel row 424A in FIG. 12 are 0°, 15°, 15°, 30° and 30°, respectively. In the FIG. 7 parallel flow tray constructed in accordance with the present invention, the slot angles for tray panels 1, 2, 3, 4 and 5 of panel row 324A adjacent to the liquid inlet 350 are 75°, 75°, 75°, 75° and 40° respectively. The slotting in the panels downstream of the tray transfer center line c-c in both FIG. 7 and FIG. 12 trays is provided in accordance with the teachings of Matsch, U.S. Pat. No. 3,759,498. These trays were designed with only 10% downcomer area, corresponding to 90% active tray area, whereas previous commercial parallel flow designs incorporating the Matsch slotting arrangement generally have been designed with downcomer areas of near 20% or higher. Although the FIG. 12 tray performed reasonably satisfactorily in this test, minimum and maximum residence times for the tray were 7.0 seconds and 17.5 seconds respectively, yielding a residence time maximum to minimum ratio of 2.50 which is above the desired range. The gas loading in this example, as in the case to be described below, was at an F-factor of 0.26, and the associated liquid loading was 0.138 cubic feet per second per foot of weir length. In contrast to the hydraulic performance of FIG. 12 tray, the FIG. 7 tray exhibited vastly improved hydraulic behavior. The minimum and maximum residence times on the FIG. 7 tray were measured at 8.5 seconds and 10.5 seconds, respectively, yielding a residence time maximum and minimum ratio of 1.24, well within the desired range of operating values and over 50% lower than the maximum minimum residence time ratio for the FIG. 12 tray.

Figure 13:
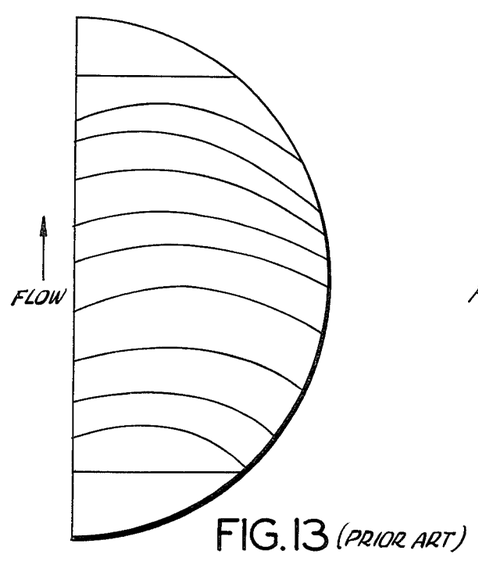
FIG. 13 is a flow distribution diagram for a tray member of the FIG 12 tray.
Figure 14:
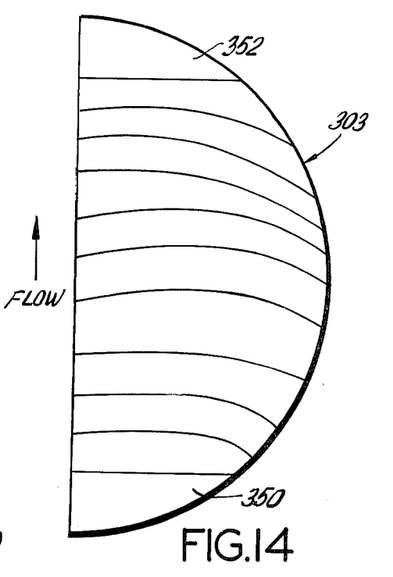
FIG 14 is a flow distribution diagram for a tray member of the FIG. 7 tray.

FIGS. 13 and 14 herein are flow distribution diagrams for tray members of the FIG. 12 and FIG. 7 trays, respectively, as derived from the above-described comparative tests. Relative to the arcuate dye tracer fronts shown in the FIG. 13 flow diagram, the dye tracer fronts in the FIG. 14 flow diagram for the tray of FIG. 7 are comparatively smoother and flatter in shape, reflecting the significant difference in residence time maximum to minimum ratio values for the respective trays.

Although preferred embodiments of this invention have been described in detail, it is contemplated that modification of the apparatus may be made and some features may be employed without others, all within the spirit and scope of the invention.

What is claimed is:

1. In a circular-edged liquid-gas contacting tray of the slotted sieve-type for effecting intimate contact between rising vapor and liquid flowing across a member of the tray having main flat top and bottom surfaces from a liquid inlet at one edge of said tray member along a liquid flow path on said main top surface including a diverging flow section adjacent said inlet to a liquid discharge at an opposite edge of said tray member, with a plurality of fixed sized openings distributed across said member and extending therethrough with walls normal to said main flat top and bottom surfaces for gas flow, and a plurality of elevated portions formed from said member across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, the improvement comprising: a first band portion of said tray member adjacent to said liquid inlet and extending therefrom downstream for distance at least 20% of the length of the tray diametral streamline from said liquid inlet to the tray transverse centerline and extending traversely outwardly from vicinity of the tray diametral streamline for distance at least 25% of the transverse length of said liquid inlet, with angular orientation of slot openings in said tray member first band portion with respect to and away from the tray diametral streamline such that the slot angle of individual slots is greater than the angle formed by the diametral streamline and a tangent line at the tray member outer edge at the point of intersection with said liquid inlet, and with the density of slotting in said first band portion such that the ratio of the total area of the slot openings therein to the total active area of said first band portion is between 0.0001 and 0.30.

2. A tray according to claim 1 wherein the slot angle of individual slots in said tray member first band portion is between 50° and 90°.

3. A tray according to claim 2 wherein said slot angle is between 75° and 90°.

4. A tray according to claim 1 having the active area of at least 60%.

5. A tray according to claim 1 wherein said tray member first band portion extends downstream from adjacent said liquid inlet for distance of from 20% to 60% of the length of the tray diametral streamline from said liquid inlet to said tray transverse centerline and extends transversely outwardly from tray diametral streamline for distance of from 25% to 100% of the transverse length of said liquid inlet.

6. A tray according to claim 1 wherein said tray member first band portion is substantially rectangular in shape.

7. A tray according to claim 1 wherein said tray member first band portion comprises two discrete band segments each disposed adjacent said liquid inlet, spaced apart from one another by distance no more than 50% of the transverse length of said liquid inlet and symmetrically aligned with respect to the tray diametral streamline.

8. A tray according to claim 1 wherein the ratio of the total area of the slot openings in said tray member first band portion to the total active area of said first band portion is between 0.001 and 0.20.

9. A tray according to claim 1 wherein said tray member first band portion is bounded at its transverse outer extremity by an adjacent second band portion of said tray member extending transversely to the tray member outer edge and downstream at least coextensively with said first band portion, said second band portion having angular orientation of slot openings therein with respect to and away from the tray diametral streamline such that the slot angle of individual slots is between 15° and 45°, and with the density of slotting in said second band portion such that the ratio of the total area of the slot openings therein to the total active area of said second band portion is between 0.0001 and 0.30.

10. A tray according to claim 9 wherein said tray member first band portion extends a distance only part of the length of the tray diametral streamline from said liquid inlet to said tray transverse centerline and is bounded at its downstream extremity by an adjacent transversely extending third band portion of said tray member extending downstream to said tray transverse centerline and having lower slot density than said first and second band portions.

11. A tray according to claim 10 wherein said tray member third band portion has slot angle less than 15° with respect to the tray diametral streamline for the slot openings therein.

12. A tray according to claim 1 wherein a transversely extending bubble promotor means is disposed on said tray member main flat top surface between said liquid inlet and said tray member first band portion.

13. A tray according to claim 12 wherein a transversely extending unslotted band portion is disposed between said bubble promotor means and said tray member first band portion.

14. A tray according to claim 1 wherein said liquid flow path on said main flat top surface includes a converging flow section adjacent said liquid discharge.

15. A tray according to claim 14 wherein said tray member first band portion extends downstream from adjacent said liquid inlet for distance of from 20% to 60% of the length of the tray diametral streamline from said liquid inlet to the tray transverse centerline.

16. A tray according to claim 14 of the parallel flow type with a center baffle extending from edge to edge of said tray member along a diameter thereof so as to divide the tray into two equal parts; liquid inlet means at the edge of one tray part immediately adjacent a first end of said center baffle for flow thereacross, and liquid outlet means immediately adjacent a second end of said center baffle at the opposite edge of said one tray part; liquid inlet means at the edge of the other tray part immediately adjacent said second end of said center baffle for flow thereacross in the opposite direction to the liquid path across said one tray part, and liquid outlet means immediately adjacent said first end of said center baffle at the opposite edge of said other tray part.

17. A tray according to claim 1 of the double-pass, side-to-center flow type with a liquid discharge extending from edge to edge of said tray along the transverse centerline thereof so as to divide the tray into two equal parts, each part having the liquid inlet thereof extending transversely and parallelly oriented with respect to said liquid discharge at the opposite edge of the tray member of said tray part.

18. A tray according to claim 1 wherein the orifice coefficient weighted open area of said first band portion is within 25% of the average overall orifice coefficient weighted open area of said tray member.

19. A tray according to claim 1 in which at least some of the slot openings in the tray member downstream the tray transverse centerline are angularly oriented with respect to and toward the tray diametral streamline such that: (a) the slot angle of individual slots increases in the transverse direction to the liquid flow path from the diametral streamline to the tray member outer edge, (b) the slot angle of individual slots also increases in the longitudinal direction of the liquid flow path to the liquid discharge and (c) the slot angle of individual slots immediately adjacent said liquid discharge and the tray member outer edge at the point of intersection with said liquid discharge is within 20° of the angle formed by a tangent line at said point of intersection and said diametral streamline.

20. In a circular-edged liquid-gas contacting tray of the double-pass, side-to-center flow slotted sieve-type for effecting intimate contact between rising vapor and liquid flowing across a member of the tray having main flat top and bottom surfaces from a liquid inlet at one edge of said tray member along a liquid flow path on said main top surface including a diverging flow section adjacent said inlet to a liquid discharge at an opposite edge of said tray member extending transversely from edge to edge of said tray along the tray transverse centerline, said liquid inlet extending transversely and parallelly oriented with respect to said liquid discharge, with a plurality of fixed sized openings distributed across said member and extending therethrough with walls normal to said main flat top and bottom surfaces for gas flow, and a plurality of elevated portions formed from said member across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, the improvement comprising: a first band portion of said tray member adjacent to said liquid inlet and extending therefrom downstream for distance of from 20% to 50% of the length of the tray diametral streamline from said liquid inlet to said liquid discharge and extending transversely outwardly from the tray diametral streamline for distance at least 25% of the transverse length of said liquid inlet, with angular orientation of slot openings in said tray member first band portion with respect to and away from the tray diametral streamline such that the slot angle of individual slots is greater than the angle formed by the diametral streamline and a tangent line at the tray member outer edge at the point of intersection with said liquid inlet, and with the density of slotting in said first band portion such that the ratio of the total area of the slot openings therein to the total active area of said first band portion is between 0.0001 and 0.30, said first band portion being bounded at each of its transverse outer extremities by adjacent second band portions of said tray member each extending transversely to the tray member outer edge and downstream to said liquid discharge, said second band portions having angular orientation of slot openings therein with respect to and away from the tray diametral streamline such that the slot angle of individual slots is between 15° and 45°, with the density of slotting in said second band portions such that the ratio of the total area of the slot openings therein to the total active area of said second band portions is between 0.0001 and 0.30, and said first band portion being bounded at its downstream extremity by an adjacent third band portion of said tray member extending transversely between said second band portions and downstream from said first band portion to said liquid discharge, said third band portion having lower slot density than said first and second band portions.

21. A tray according to claim 20 wherein the slot angle of individual slots in said tray member first band portion is between 75° and 90°.

22. A tray according to claim 20 wherein the slot angle of individual slots in said tray member third band portion is 0°.

* * * * *